(12) United States Patent
Obinata

(10) Patent No.: US 11,656,474 B2
(45) Date of Patent: May 23, 2023

(54) COLLIMATOR LENS, LIGHT SOURCE DEVICE, AND IMAGE DISPLAY DEVICE

(71) Applicant: SONY GROUP CORPORATION, Tokyo (JP)

(72) Inventor: Mariko Obinata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 139 days.

(21) Appl. No.: 17/420,466

(22) PCT Filed: Dec. 7, 2019

(86) PCT No.: PCT/JP2019/047974
§ 371 (c)(1),
(2) Date: Jul. 2, 2021

(87) PCT Pub. No.: WO2020/149047
PCT Pub. Date: Jul. 23, 2020

(65) Prior Publication Data
US 2022/0082847 A1    Mar. 17, 2022

(30) Foreign Application Priority Data
Jan. 15, 2019    (JP) .............................. JP2019-004219

(51) Int. Cl.
*G02B 27/30*    (2006.01)
*G02B 27/09*    (2006.01)
*G02B 27/14*    (2006.01)

(52) U.S. Cl.
CPC ......... *G02B 27/30* (2013.01); *G02B 27/0955* (2013.01); *G02B 27/141* (2013.01)

(58) Field of Classification Search
None
See application file for complete search history.

(56) References Cited

U.S. PATENT DOCUMENTS

2007/0291491 A1* 12/2007 Li ....................... G03B 21/208
                                                                362/307
2010/0045937 A1    2/2010 Li
(Continued)

FOREIGN PATENT DOCUMENTS

| CN | 103969934 | 8/2014 |
| JP | 2010-503004 | 1/2010 |

(Continued)

OTHER PUBLICATIONS

International Search Report prepared by the Japan Patent Office dated Feb. 20, 2020, for International Application No. PCT/JP2019/047974.

*Primary Examiner* — Bao-Luan Q Le
*Assistant Examiner* — Danell L Owens
(74) *Attorney, Agent, or Firm* — Sheridan Ross P.C.

(57) ABSTRACT

There is provided a collimator lens capable of adjusting a reflection angle of fluorescence with high accuracy and emitting the fluorescence with high efficiency. Provided is a collimator lens including an aperture, a reflecting portion, and a condensing portion, in which the reflecting portion formed on an inner peripheral surface reflects, to the condensing portion, light emitted from the condensing portion, and the light collected at the condensing portion is emitted toward the aperture or the reflecting portion. Furthermore, there is provided a light source device including the collimator lens, an excitation optical system, and a phosphor.

12 Claims, 7 Drawing Sheets

(56) References Cited

U.S. PATENT DOCUMENTS

2012/0154767 A1    6/2012   Kimura et al.
2014/0022512 A1    1/2014   Li et al.
2014/0078730 A1    3/2014   Li

FOREIGN PATENT DOCUMENTS

| | | |
|---|---|---|
| JP | 2012-500413 | 1/2012 |
| JP | 2015-031925 | 2/2015 |
| JP | 2015-143772 | 8/2015 |
| JP | 2015-146008 | 8/2015 |
| JP | 2015-528988 | 10/2015 |
| JP | 2015-531982 | 11/2015 |
| JP | 2016-170390 | 9/2016 |
| JP | 2017-062889 | 3/2017 |
| WO | WO 2007/146373 | 12/2007 |
| WO | WO 2010/019945 | 2/2010 |
| WO | WO 2016/027657 | 2/2016 |

* cited by examiner

COLLIMATOR LENS, LIGHT SOURCE DEVICE, AND IMAGE DISPLAY DEVICE

CROSS REFERENCE TO RELATED APPLICATIONS

This application is a national stage application under 35 U.S.C. 371 and claims the benefit of PCT Application No. PCT/JP2019/0047974 having an international filing date of 7 Dec. 2019, which designated the United States, which PCT application claimed the benefit of Japanese Patent Application No. 2019-004219 filed 15 Jan. 2019, the entire disclosures of each of which are incorporated herein by reference.

TECHNICAL FIELD

The present technology relates to a collimator lens, a light source device, and an image display device.

BACKGROUND ART

Conventionally, there is a technology for irradiating a phosphor with excitation light and utilizing fluorescence emitted by the phosphor. However, the fluorescence spreads at a high angle, and thus diffuses as the fluorescence propagates. Therefore, as in Patent Document 1, a collimator lens that converts the fluorescence into a substantially parallel luminous flux is used.

Patent Document 1 discloses a light source device including a light emitting element, a condensing optical system on which a first component of light emitted from the light emitting element is incident, an optical element on which the first component transmitted through the condensing optical system is incident, and a pickup optical system on which the first component having passed through the optical element is incident, in which at least one of the condensing optical system or the pickup optical system includes a first lens including quartz. In Patent Document 1, it is explained that the condensing optical system including the first lens cooperates with other components to make the distribution of light illuminance uniform.

However, since the fluorescence spreads at a high angle, there is a problem that the focal length of the collimator lens is short and the etendue is large. Therefore, Patent Document 2 discloses a technology for reflecting and reusing fluorescence having a large angle.

Patent Document 2 discloses a fluorescent lamp including a phosphor material and an excitation laser source having an output toward the phosphor material, in which the phosphor material emits light condensed on a central axis, the lamp further includes a light-reusing collar including a central aperture through which the central axis passes, light emission at an angle smaller than a predetermined angle with respect to the central axis passes through the central aperture, light emission at an angle greater than the predetermined angle is reflected toward the phosphor material by the light-reusing collar for light reuse, and the light-reusing collar is located relative to the phosphor material. In Patent Document 2, it is explained that the light output from the phosphor material is reflected by the light-reusing collar and returns to the phosphor material.

CITATION LIST

Patent Document

Patent Document 1: Japanese Patent Application Laid-Open No. 2016-170390

Patent Document 2: Japanese Patent Application Laid-Open No. 2015-528988

SUMMARY OF THE INVENTION

Problems to be Solved by the Invention

However, since the light-reusing collar disclosed in Patent Document 2 has a configuration separate from a lens, it is necessary to adjust the angle at which the light is reflected with high accuracy. Furthermore, the light utilization efficiency may decrease because a holding portion of the reusing collar blocks the light.

Therefore, a main object of the present technology is to provide a collimator lens capable of adjusting a reflection angle of fluorescence with high accuracy and emitting the fluorescence with high efficiency.

Solutions to Problems

The present technology provides a collimator lens including an aperture, a reflecting portion, and a condensing portion, in which the reflecting portion formed on an inner peripheral surface reflects, to the condensing portion, light emitted from the condensing portion, and the light collected at the condensing portion is emitted toward the aperture or the reflecting portion.

A numerical aperture of the collimator lens may be 0.6 or more and 0.99 or less

A shape of the reflecting portion may be an aspherical surface or a spherical surface.

A material of the reflecting portion may be a metal film.

The collimator lens may include a plurality of lenses, and at least one lens may include the reflecting portion.

The reflecting portion may transmit light in a predetermined wavelength range and reflect light in a predetermined wavelength range.

The reflecting portion may be a dichroic mirror.

Furthermore, the present technology also provides a light source device including the collimator lens, an excitation optical system, and a phosphor.

The phosphor may rotate or does not have to rotate.

The excitation optical system may be arranged on a side of the aperture of the collimator lens, and the phosphor may be arranged on a side of the condensing portion of the collimator lens.

The excitation optical system and the phosphor may be arranged on a side of the condensing portion of the collimator lens.

Furthermore, the present technology also provides an image display device including the light source device.

MODE FOR CARRYING OUT THE INVENTION

Hereinafter, suitable modes for carrying out the present technology will be described with reference to the accompanying drawings. Note that embodiments described below show typical embodiments of the present technology, and the scope of the present technology is not limited to these embodiments. Note that the present technology will be described in the following order.

1. First Embodiment according to Present Technology (Collimator Lens)
2. Second Embodiment according to Present Technology (Plurality of Lenses)
3. Third Embodiment according to Present Technology (Wavelength Selectivity of Reflecting Portion)
4. Fourth Embodiment according to Present Technology (Light Source Device)
5. Fifth Embodiment according to Present Technology (Image Display Device)

1. First Embodiment According to Present Technology (Collimator Lens)

Figure 1:
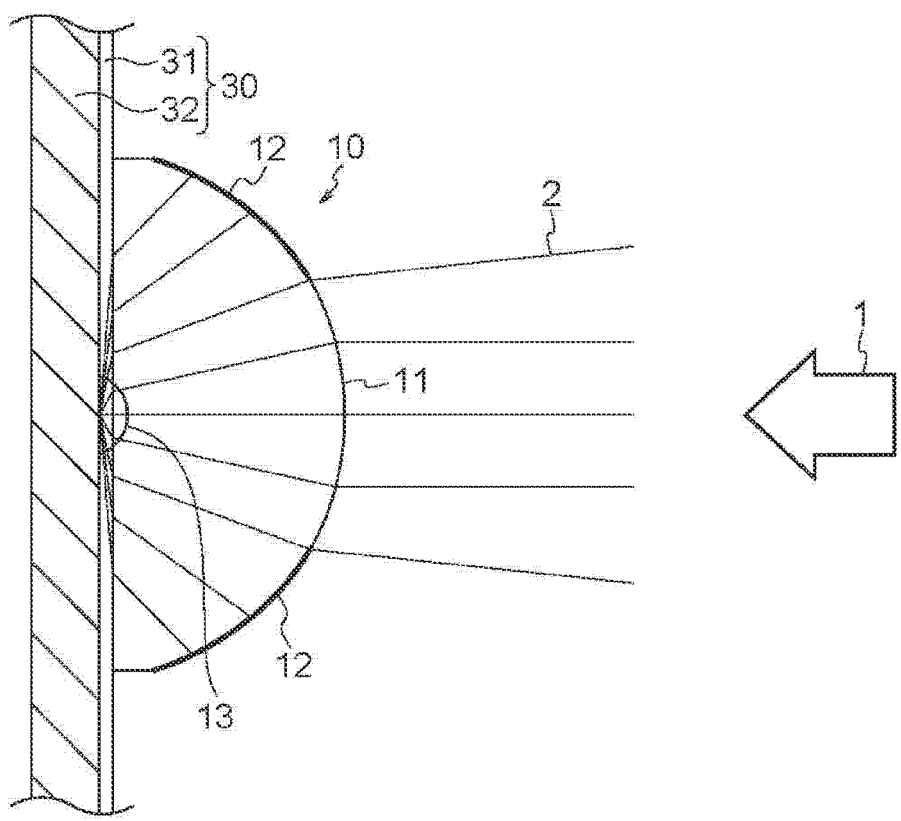
FIG. 1 is a side view of a collimator lens according to the present technology.

FIG. 1 illustrates a side view of a collimator lens 10 according to the present technology. As illustrated in FIG. 1, the collimator lens 10 according to the present technology includes an aperture 11, a reflecting portion 12, and a condensing portion 13.

The reflecting portion 12 is formed on an inner peripheral surface of the collimator lens 10. Furthermore, the reflecting portion 12 is formed at a position where light having a high angle component out of light incident on the collimator lens 10 collides.

The reflecting portion 12 reflects light emitted from the condensing portion 13 toward the condensing portion 13. The light collected at the condensing portion 13 is again emitted toward the aperture 11 or the reflecting portion 12. Light having a low angle component is emitted toward the aperture 11, and the light having the high angle component is emitted toward the reflecting portion 12.

Note that the reflecting portion 12 may reflect the light emitted from the condensing portion 13 toward a reflecting portion 12 on another surface. For example, in a case where the reflecting portions 12 are formed on an upper surface and a lower surface of the inner peripheral surface of the collimator lens 10, the reflecting portion 12 on the upper surface may reflect light toward the reflecting portion 12 on the lower surface.

Irradiation by the condensing portion 13 and reflection by the reflecting portion 12 are repeated, so that the light having the high angle component is gradually converted into the light having the low angle component. Then, substantially parallel light 2 is emitted from the aperture 11 to the outside of the collimator lens 10.

In a case where the collimator lens 10 captures the light having the high angle component, the focal length is short and the etendue is large. In order to improve the light utilization efficiency, it is desirable that the etendue is small. Therefore, the collimator lens 10 according to the present technology converts the light having the high angle component into the light having the low angle component.

In the present technology, since the inner peripheral surface of the collimator lens 10 and the reflecting portion 12 are coupled, an angle at which the reflecting portion 12 reflects light can be adjusted with high accuracy.

Furthermore, since there is no member for holding the reflecting portion 12, the light emitted from the condensing portion 13 is not blocked. Therefore, the collimator lens 10 can emit light with high efficiency.

Note that, in the above-described configuration, as an example, a phosphor 30 is irradiated with excitation light 1 and fluorescence emitted by the phosphor 30 is used as a light source, but the light source is not limited to the phosphor 30. As an example, a light emitting diode, a mercury lamp, or the like can be used as the light source.

Incidentally, in the design of the collimator lens 10, it is necessary to mainly consider a parallel characteristic and a reflection characteristic. The parallel characteristic is a characteristic that the aperture 11 converts the light incident on the collimator lens 10 into parallel light and emits the parallel light. The reflection characteristic is a characteristic that the reflecting portion 12 reflects the light incident on the collimator lens 10 to the condensing portion 13.

First, the parallel characteristic will be described. It is desirable that the light 2 emitted by the aperture 11 is parallel, but the light 2 may be substantially parallel as long as the light 2 can be guided to an optical system. For example, the light 2 may contain light beams at angles of 0 to 9 degrees (160 milliradians) with respect to an optical axis.

Furthermore, the larger a numerical aperture (Numerical Aperture: NA) of the collimator lens 10, the brighter the light 2 emitted by the aperture 11. Assuming that a refractive index of the condensing portion 13 is n and an irradiation angle of the phosphor 30 is θ, the numerical aperture NA can be obtained by the following equation (1).

$$NA = n \times \sin\theta \tag{1}$$

The numerical aperture of the collimator lens 10 according to the present technology is preferably 0.6 or more and 0.99 or less. Furthermore, it is desirable that the numerical aperture of the collimator lens 10 is 0.95 or more and 0.99 or less.

Next, the reflection characteristic will be described. The reflection characteristic depends on the shape, material, and area of the reflecting portion 12.

The shape of the reflecting portion 12 will be described. Specifically, the reflection characteristic depends on whether the shape of the reflecting portion 12 is a spherical surface or an aspherical surface.

In one embodiment illustrated in FIG. 1, the reflecting portion 12 has a spherical surface. The spherical surface includes, for example, an ellipsoidal surface, a toroidal surface, and the like.

In a case where the phosphor 30 does not rotate, the reflecting portion 12 may have the spherical surface. However, in a case where the phosphor 30 rotates, a problem arises if the reflecting portion 12 has the spherical surface.

Figure 2:
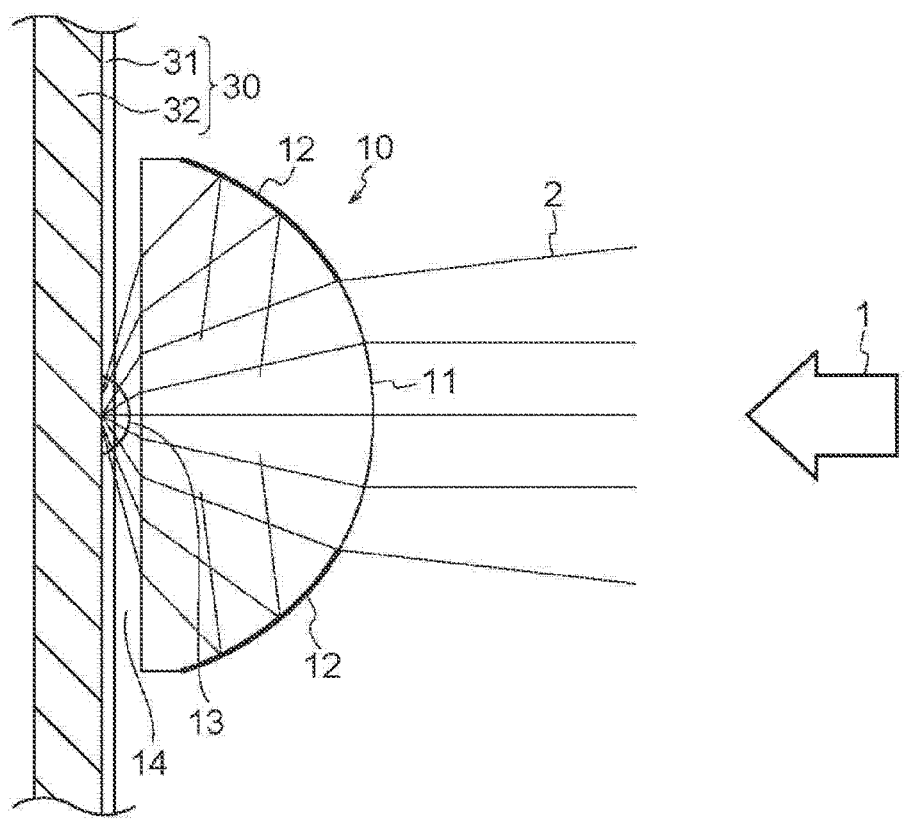
FIG. 2 is a reference diagram for describing characteristics of the collimator lens according to the present technology.

FIG. 2 illustrates a reference diagram for describing characteristics of the collimator lens 10 according to the present technology. As illustrated in FIG. 2, an air layer 14 is formed between a surface 31 of the phosphor 30 that rotates and the collimator lens 10. The reason why the air layer 14 is formed is that, if the phosphor surface 31 and the collimator lens 10 are in close contact with each other, the phosphor 30 cannot rotate due to a frictional force generated between the phosphor surface 31 and the collimator lens 10.

Since the air layer 14 is formed, the air layer 14 refracts the light reflected by the reflecting portion 12. Due to this refraction, an optical path of the light emitted to the reflecting portion 12 and an optical path of the light reflected by the reflecting portion 12 are different. As a result, the reflected light is not condensed at the condensing portion 13, and the light utilization efficiency decreases.

Figure 3:
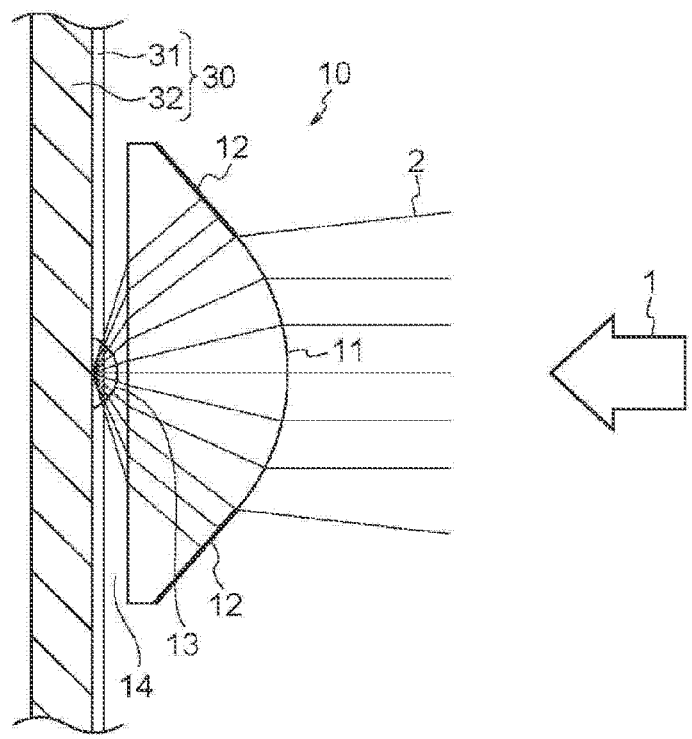
FIG. 3 is a side view of the collimator lens according to the present technology.

Then, FIG. 3 illustrates a side view of the collimator lens 10 according to the present technology. As illustrated in FIG. 3, in a case where the air layer 14 is formed between the phosphor surface 31 and the collimator lens 10, it is desirable that the reflecting portion 12 is an aspherical surface. If the reflecting portion 12 is the aspherical surface, the light reflected by the reflecting portion 12 can be appropriately emitted to the condensing portion 13.

Next, the material of the reflecting portion 12 will be described. A metal film can be used for the reflecting portion 12. Furthermore, since the light emitted to the reflecting portion 12 may reach several hundred watts, it is desirable that the metal film has light reflectivity and high heat resistance. For example, silver, aluminum, or the like can be used for this metal film.

Finally, the area of the reflecting portion 12 will be described. The larger the area of the reflecting portion 12, the smaller the area of the aperture 11. As a result, the etendue is smaller. The smaller the etendue, the higher the light utilization efficiency.

2. Second Embodiment According to Present Technology (Plurality of Lenses)

In order for a single collimator lens to capture light having a high angle component, convert the light into substantially parallel light, and emit the substantially parallel light, an advanced design of the collimator lens is required. Therefore, a collimator lens may include a plurality of lenses.

Figure 4:
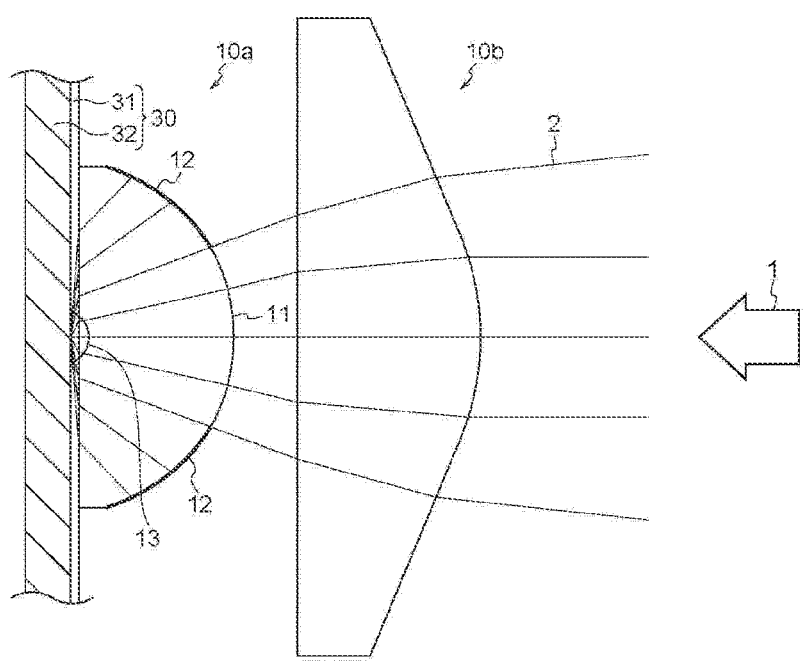
FIG. 4 is a side view of a collimator lens according to the present technology.

FIG. 4 illustrates a side view of a collimator lens according to the present technology. The collimator lens includes a plurality of lenses (10a, 10b), and at least one or more lenses (10a, 10b) include a reflecting portion 12. In one embodiment illustrated in FIG. 4, the first lens 10a includes the reflecting portion 12.

Since the first lens 10a and a phosphor surface 31 are in close contact with each other and it is not necessary to consider refraction of light by an air layer, the reflecting portion 12 is a spherical surface.

Since the collimator lens includes the plurality of lenses (10a, 10b) as described above, the design of the collimator lens is easy. For example, the first lens 10a converts light having a high angle component into light having a slightly low angle component. Then, the second lens 10b can convert the light having the low angle component into substantially parallel light.

Furthermore, since the collimator lens includes the plurality of lenses (10a, 10b), a reflection characteristic and a parallel characteristic of light can be designed at the same time. For example, the reflection characteristic can be designed in the first lens 10a including the reflecting portion 12, and the parallel characteristic can be designed in the second lens 10b that emits the substantially parallel light.

Figure 5:
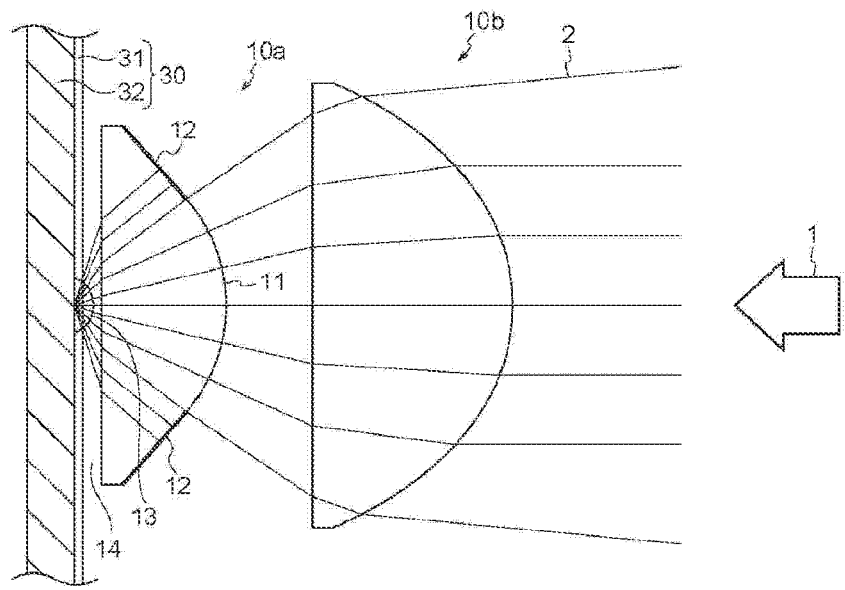
FIG. 5 is a side view of a collimator lens according to the present technology.

FIG. 5 illustrates a side view of a collimator lens according to the present technology. As illustrated in FIG. 5, an air layer 14 is formed between the first lens 10a and the phosphor surface 31. Since it is necessary to consider the refraction of light by the air layer 14, the reflecting portion 12 of the first lens 10a is an aspherical surface.

Figure 6:
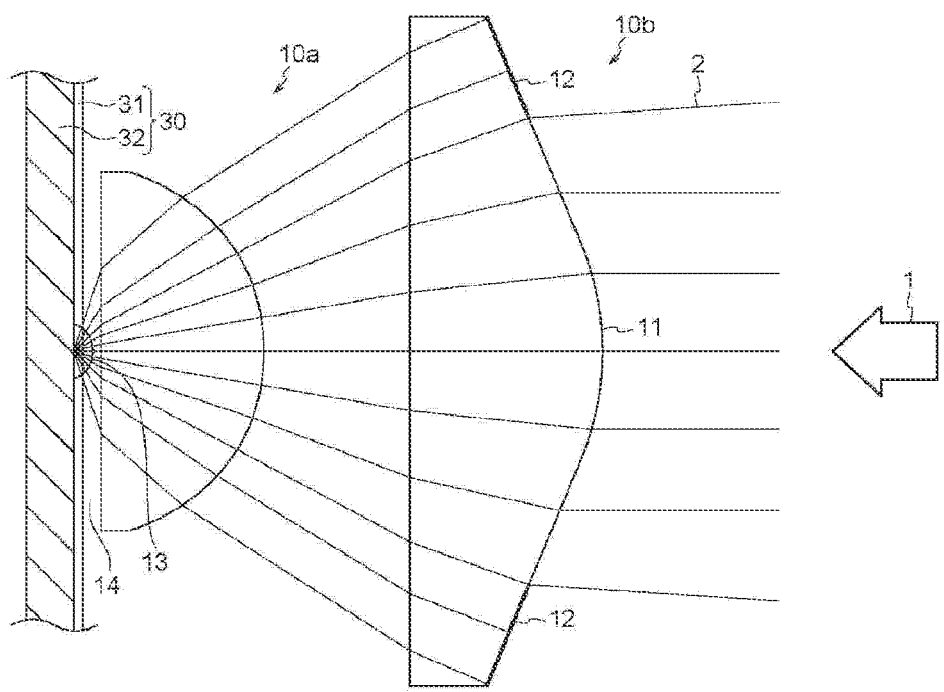
FIG. 6 is a side view of a collimator lens according to the present technology.

FIG. 6 illustrates a side view of a collimator lens according to the present technology. As illustrated in FIG. 6, the second lens 10b may include the reflecting portion 12. In this case, the air layer 14 is formed between the second lens 10b and the phosphor surface 31. Since it is necessary to consider the refraction of light by the air layer 14, the reflecting portion 12 of the second lens 10b is an aspherical surface.

Figure 7:
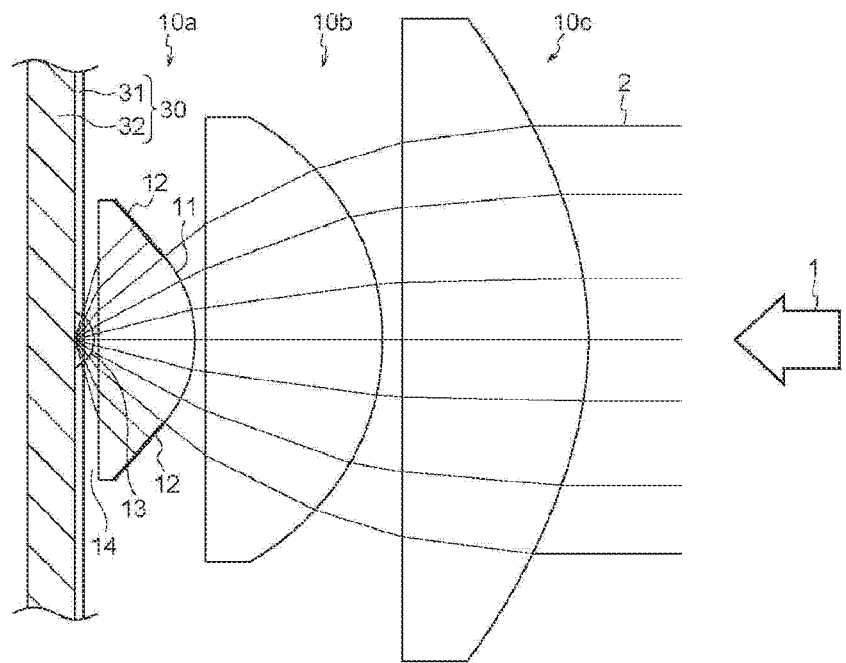
FIG. 7 is a side view of a collimator lens according to the present technology.

FIG. 7 illustrates a side view of a collimator lens according to the present technology. As illustrated in FIG. 7, the collimator lens may include three lenses (10a, 10b, 10c). If the number of lenses is further increased, the design of the collimator lens is easier.

In one embodiment illustrated in FIG. 7, for example, the first lens 10a converts light having a high angle component into light having a slightly low angle component. Then, the second lens 10b and the third lens 10c can convert the light having the low angle component into substantially parallel light.

In the embodiment illustrated in FIG. 7, the first lens 10a includes the reflecting portion 12, but the second lens 10b or the third lens 10c may include the reflecting portion 12. Furthermore, a plurality of lenses may include the reflecting portions 12.

Note that the collimator lens according to the present technology may include four or more lenses.

3. Third Embodiment According to Present Technology (Wavelength Selectivity of Reflecting Portion)

A reflecting portion 12 may transmit a part of excitation light 1 without reflecting the part of the excitation light 1.

Figure 8:
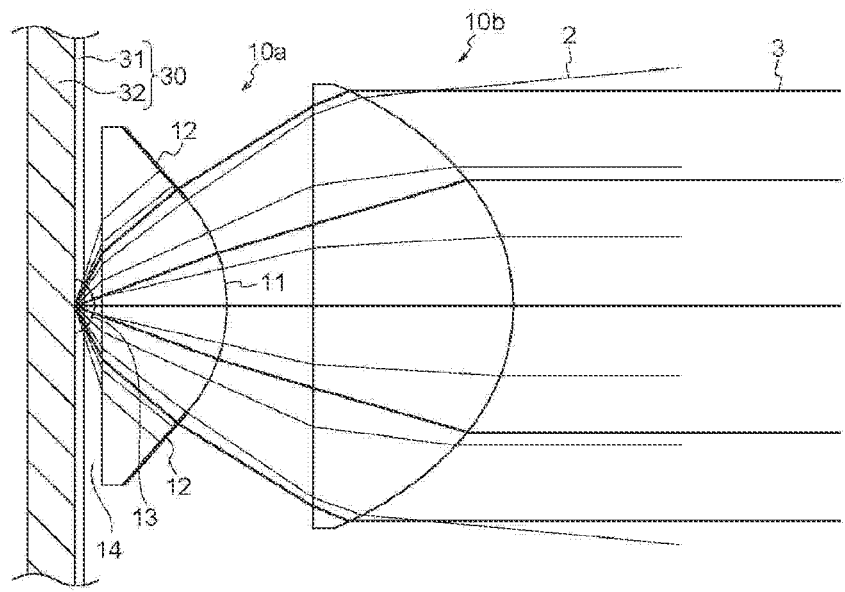
FIG. 8 is a side view of a collimator lens according to the present technology.

FIG. 8 illustrates a side view of a collimator lens according to the present technology. As illustrated in FIG. 8, regarding the reflecting portion 12, for example, the reflecting portion 12 may transmit light 3 in a predetermined wavelength range and reflect light 3 in a predetermined wavelength range.

For example, in a case where the reflecting portion 12 transmits blue excitation light 2 and an aperture 11 also transmits the blue excitation light 2, the excitation light 2 from an excitation optical system and the excitation light 3 transmitted through the reflecting portion 12 are added together, and thus the light amount of the excitation light 2 can be increased.

Furthermore, since the reflecting portion 12 transmits the excitation light 2, it is not necessary to employ a design in which only the aperture 11 transmits the excitation light 2.

For the reflecting portion 12, for example, a dichroic mirror can be used.

Note that the light transmitted through or reflected by the reflecting portion 12 is not limited to the blue light, and may be, for example, red light or green light. Furthermore, the light is not limited to visible light, and may be, for example, ultraviolet rays or infrared rays.

4. Fourth Embodiment According to Present Technology (Light Source Device)

Figure 9:
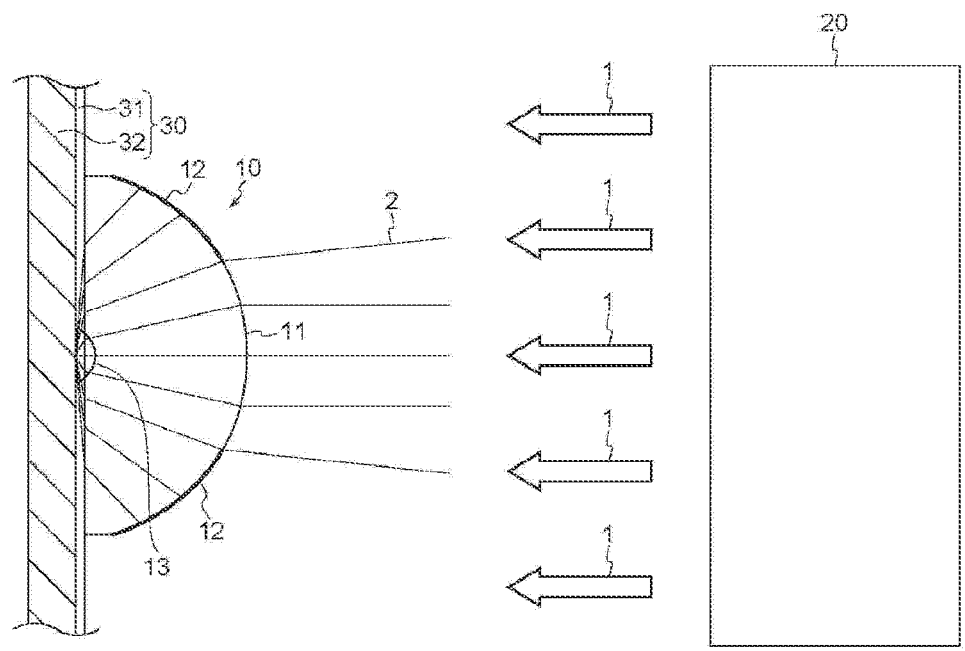
FIG. 9 is a configuration diagram of a light source device according to the present technology.

FIG. 9 illustrates a configuration diagram of a light source device according to the present technology. As illustrated in FIG. 9, the light source device can include a collimator lens 10 including at least one lens, an excitation optical system 20, and a phosphor 30.

Note that the collimator lens 10 may include a plurality of lenses.

The excitation optical system 20 irradiates the phosphor 30 with excitation light 1. A fluorescent portion 32 of the phosphor 30 is excited by the emitted excitation light 1, and irradiates the collimator lens 10 with fluorescence.

A reflecting portion 12 is formed on an inner peripheral surface of the collimator lens 10. Furthermore, the reflecting portion 12 is formed at a position where light having a high angle component out of light incident on the collimator lens 10 collides.

The reflecting portion 12 reflects light emitted from a condensing portion 13 toward the condensing portion 13. The light collected at the condensing portion 13 is again emitted toward an aperture 11 or the reflecting portion 12. Light having a low angle component is emitted toward the aperture 11, and the light having the high angle component is emitted toward the reflecting portion 12.

Note that the reflecting portion 12 may reflect the light emitted from the condensing portion 13 toward a reflecting portion 12 on another surface. For example, in a case where the reflecting portions 12 are formed on an upper surface and a lower surface of the inner peripheral surface of the collimator lens 10, the reflecting portion 12 on the upper surface may reflect light toward the reflecting portion 12 on the lower surface.

Irradiation by the condensing portion 13 and reflection by the reflecting portion 12 are repeated, so that the light having the high angle component is gradually converted into the light having the low angle component. Then, substantially parallel light 2 is emitted from the aperture 11 to the outside of the collimator lens 10.

The phosphor 30 may rotate or does not have to rotate.

In a case where the phosphor 30 does not rotate, an air layer 14 does not have to be formed between the collimator lens 10 and a phosphor surface 31. In a case where the air layer 14 is not formed, the shape of the reflecting portion 12 may be a spherical surface as illustrated in FIG. 9.

Note that, in a case where the phosphor 30 rotates, the air layer 14 may be formed between the collimator lens 10 and the phosphor surface 31. In a case where the air layer 14 is formed, it is desirable that the shape of the reflecting portion 12 is an aspherical surface as described above.

The excitation optical system 20 is arranged on a side of the aperture 11 of the collimator lens 10. The phosphor 30 is arranged on a side of the condensing portion 13 of the collimator lens 10. Therefore, the excitation light 1 is emitted from the side of the aperture 11.

Figure 10:
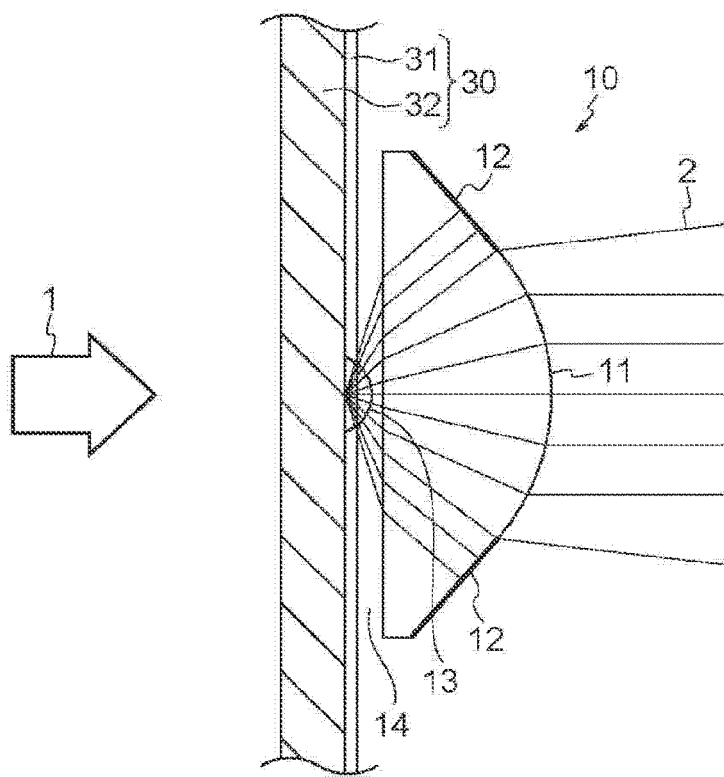
FIG. 10 is a side view of a collimator lens according to the present technology.

Meanwhile, as illustrated in FIG. 10, the excitation light 1 may be emitted from the side of the condensing portion 13. In this case, the excitation optical system 20 and the phosphor 30 may be arranged on the side of the condensing portion 13 of the collimator lens 10.

Incidentally, the light utilization efficiency correlates with a light reuse rate by the light source device. The reuse rate is a rate at which the phosphor 30 scatters light without absorbing the light. The higher the reuse rate, the less light the phosphor 30 absorbs, and thus the light utilization efficiency is higher. The phosphor 30 having a low reuse rate absorbs fluorescence each time the reflection by the reflecting portion 12 is repeated. Therefore, the fluorescence disappears eventually.

Furthermore, an area ratio between the aperture 11 and the reflecting portion 12 correlates with the light reuse rate and a numerical aperture. In a case where the reuse rate is high, it is necessary to increase the area ratio of the reflecting portion 12. In a case where the reuse rate is low, it is necessary to decrease the area ratio of the reflecting portion 12. Therefore, it is necessary to design the area ratio between the aperture 11 and the reflecting portion 12 in consideration of the light reuse rate.

Note that, in a case where the collimator lens 10 includes a plurality of lenses, it is desirable that the lens closest to a light source includes the reflecting portion 12. This is because the air layer between the light source and the reflecting portion 12 is reduced, so that the light reuse rate is increased.

5. Fifth Embodiment According to Present Technology (Image Display Device)

Figure 11:
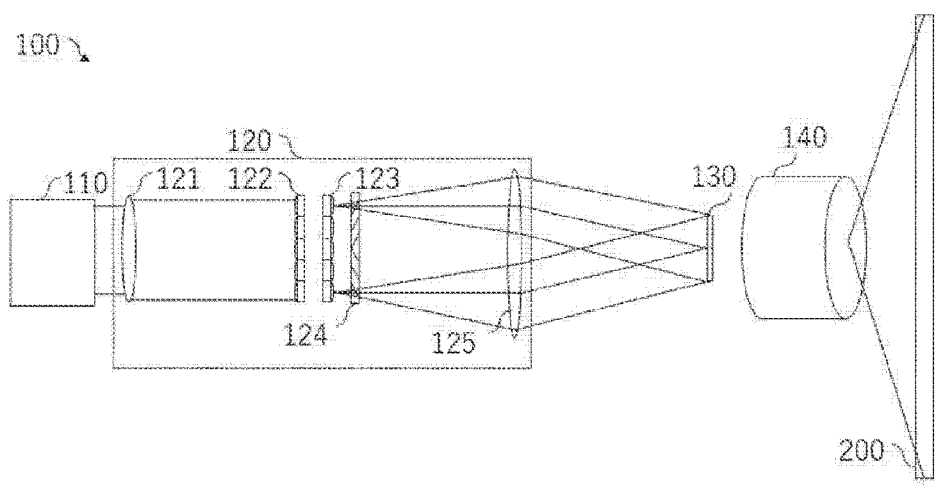
FIG. 11 is a configuration diagram of an image display device according to the present technology.

FIG. 11 illustrates a configuration diagram of an optical image display device 100 according to the present technology. As illustrated in FIG. 11, the image display device 100 can include at least a light source device 110. As the light source device 110, the light source device according to the fourth embodiment described above can be used.

The image display device 100 can further include an illumination optical system 120, a spatial light modulator 130, and a projection lens 140.

The light source device 110 irradiates the illumination optical system 120 with light. The illumination optical system 120 adjusts the light to obtain an even brightness and irradiates the spatial light modulator 130. The spatial light modulator 130 transmits the light in response to a video signal. The projection lens 140 projects an image onto a screen 200 or the like.

The illumination optical system 120 can include a plurality of lenses (121, 122, 123, 125), a polarization conversion element 124, and the like.

Generally, the illumination optical system 120 converts light into parallel light, but in the present technology, the light source device 110 applies parallel light. Therefore, a burden on the illumination optical system 120 can be reduced. This configuration expands the range of application of the technology, and can also contribute to miniaturization of the image display device 100.

Note that the light source device 110 according to the present technology can be used not only for the image display device 100 but also for an analysis device, for example. For example, the present technology may be used for a flow cytometer, a DNA chip, a protein chip, or the like. The present technology can use fluorescence with high efficiency, and thus has an effect of increasing the sensitivity of the analysis device.

Note that the effects described in the present specification are merely examples and are not limited, and other effects may be obtained.

Note that the present technology may have the following configurations.

[1] A collimator lens including
an aperture,
a reflecting portion, and
a condensing portion, in which
the reflecting portion formed on an inner peripheral surface reflects, to the condensing portion, light emitted from the condensing portion, and
the light collected at the condensing portion is emitted toward the aperture or the reflecting portion.

[2] The collimator lens according to [1], in which a numerical aperture is 0.6 or more and 0.99 or less.

[3] The collimator lens according to [1] or [2], in which a shape of the reflecting portion is an aspherical surface or a spherical surface.

[4] The collimator lens according to any one of [1] to [3], in which a material of the reflecting portion is a metal film.

[5] The collimator lens according to any one of [1] to [4], further including a plurality of lenses, in which at least one lens includes the reflecting portion.

[6] The collimator lens according to any one of [1] to [5], in which the reflecting portion transmits light in a predetermined wavelength range and reflects light in a predetermined wavelength range.

[7] The collimator lens according to any one of [1] to [6], in which the reflecting portion is a dichroic mirror.

[8] A light source device including the collimator lens according to any one of [1] to [7], an excitation optical system, and a phosphor.

[9] The light source device according to [8], in which the phosphor rotates or does not rotate.

[10] The light source device according to [8] or [9], in which the excitation optical system is arranged on a side of the aperture of the collimator lens, and the phosphor is arranged on a side of the condensing portion of the collimator lens.

[11] The light source device according to any one of [8] to [10], in which the excitation optical system and the phosphor are arranged on a side of the condensing portion of the collimator lens.

[12] An image display device including the light source device according to any one of [8] to [11].

REFERENCE SIGNS LIST

1 Excitation light
2 Light emitted from aperture
3 Light emitted from reflecting portion
10 Collimator lens
11 Aperture
12 Reflecting portion
13 Condensing portion
14 Air layer
10a First lens
10b Second lens
10c Third lens
20 Excitation optical system
30 Phosphor
100 Image display device
110 Light source device
120 Illumination optical system
130 Spatial light modulator
140 Projection lens
200 Screen

What is claimed is:

1. A collimator lens comprising:
an aperture;
a reflecting portion; and
a condensing portion, wherein
the reflecting portion formed on an inner peripheral surface reflects, to the condensing portion, light emitted from the condensing portion, and
the light collected at the condensing portion is emitted toward the aperture or the reflecting portion.

2. The collimator lens according to claim 1, wherein a numerical aperture is 0.6 or more and 0.99 or less.

3. The collimator lens according to claim 1, wherein a shape of the reflecting portion is an aspherical surface or a spherical surface.

4. The collimator lens according to claim 1, wherein a material of the reflecting portion is a metal film.

5. The collimator lens according to claim 1, further comprising
a plurality of lenses, wherein
at least one lens includes the reflecting portion.

6. The collimator lens according to claim 1, wherein the reflecting portion transmits light in a predetermined wavelength range and reflects light in a predetermined wavelength range.

7. The collimator lens according to claim 1, wherein the reflecting portion is a dichroic mirror.

8. A light source device comprising:
the collimator lens according to claim 1;
an excitation optical system; and
a phosphor.

9. The light source device according to claim 8, wherein the phosphor rotates or does not rotate.

10. The light source device according to claim 8, wherein the excitation optical system is arranged on a side of the aperture of the collimator lens, and
the phosphor is arranged on a side of the condensing portion of the collimator lens.

11. The light source device according to claim 8, wherein the excitation optical system and the phosphor are arranged on a side of the condensing portion of the collimator lens.

12. An image display device comprising
the light source device according to claim 8.

* * * * *